(12) United States Patent
Liu

(10) Patent No.: US 6,876,777 B2
(45) Date of Patent: Apr. 5, 2005

(54) IMAGE ENHANCEMENT METHOD

(75) Inventor: Casper Liu, Taipei (TW)

(73) Assignee: Ulead Systems, Inc., Taipei (TW)

( * ) Notice: Subject to any disclaimer, the term of this patent is extended or adjusted under 35 U.S.C. 154(b) by 587 days.

(21) Appl. No.: 10/092,311

(22) Filed: Mar. 7, 2002

(65) Prior Publication Data
US 2003/0031376 A1 Feb. 13, 2003

(30) Foreign Application Priority Data
Aug. 13, 2001 (TW) .................................. 90119791 A

(51) Int. Cl.$^7$ .............................................. G06K 9/40
(52) U.S. Cl. ...................... 382/266; 382/118; 382/274; 382/275; 358/3.26; 358/3.27; 358/463
(58) Field of Search ................................ 382/118, 128, 382/260, 263, 264, 266, 269, 275, 283; 358/3.26, 3.27, 512, 517, 518, 463

(56) References Cited
U.S. PATENT DOCUMENTS 5,576,778 A * 11/1996 Fujie et al. ................. 351/177
5,611,027 A * 3/1997 Edgar ......................... 715/853
6,333,766 B1 * 12/2001 Kougami et al. ........... 348/687
6,611,613 B1 * 8/2003 Kang et al. ................. 382/118
6,678,407 B1 * 1/2004 Tajima ....................... 382/167

* cited by examiner

Primary Examiner—Bhavesh M. Mehta
Assistant Examiner—Yosef Kassa
(74) Attorney, Agent, or Firm—Birch, Stewart, Kolasch & Birch, LLP

(57) ABSTRACT

An image enhancement method. In the first stage, an image described in first image format is received. Then, each pixel is assessed with respect to its location on the edge of the image, and the value of the pixel in second image format is assessed with respect to its falling within the range of skin tones. A first smooth filter mask is dynamically generated if the pixel is not on the edge and the value does not fall into the range of skin tones, and a smooth process is performed on the pixel according to the first smooth filter mask. In the second stage, a second smooth filter mask is dynamically generated for each pixel in the image, and a general smooth process is performed on the pixel according to the second smooth filter mask.

13 Claims, 5 Drawing Sheets

IMAGE ENHANCEMENT METHOD

BACKGROUND OF THE INVENTION

1. Field of the Invention

The present invention relates to an image enhancement method, and particularly to an image enhancement method that beautifies skin in images.

2. Description of the Related Art

With the popularization of image capture devices, such as digital cameras and scanners, various image process methods and special effects have been developed for people to edit digital images.

In image enhancement, for example, the method of eliminating irregularities in skin color on pictures, a smooth filter is always employed to perform a smooth process on the R, G, and B channels of images, so as to average the color in a region and eliminate irregularities in skin color.

The effects of conventional image enhancement method are determined by the number of irregularities. The conventional method can beautify skin if there are only a few irregularities on the skin. However, the conventional method may smudge the skin by averaging the irregularities with the skin if the irregularities are averagely distributed over the skin. In addition, the edge area in the image may be obscured, since the smooth process is performed on each pixel in the image.

SUMMARY OF THE INVENTION

It is therefore an object of the present invention to provide an image enhancement method that eliminates the influence of irregularities in smooth process, so as to beautify the images.

To achieve the above object, the present invention provides an image enhancement method. According to the embodiment of the present invention, the image enhancement method includes two stages. In first stage, the irregularities are eliminated substantially, and in second stage, the process result of first stage is further smooth processed.

In first stage, an image described in first image format is received. Then, the value of each pixel in the image is calculated in a second image format. Thereafter, each pixel is assessed with respect to its location on the edge of the image, and the value of the pixel in second image format is assessed with respect to its falling within the range of skin tones. Then, a first smooth filter mask is dynamically generated if the pixel is not on the edge and the value does not fall into the range of skin tones, and a smooth process is performed on the pixel according to the first smooth filter mask.

In this stage, the first smooth filter mask may be a matrix that increases the weighted value of the adjacent pixels that fall into the range of skin tones, thus averaging the adjacent pixels and the pixel to eliminate the irregularity pixel. For example, the pixel can be smooth processed by referring the adjacent pixels if the adjacent pixels fall into the range of skin tones.

In second stage, a second smooth filter mask is dynamically generated for each pixel in the image, and a general smooth process is performed on the pixel according to the second smooth filter mask.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Referring to the accompanying figures, the preferred embodiments of the present invention follow.

[Eliminating Irregularities]

Figure 1:
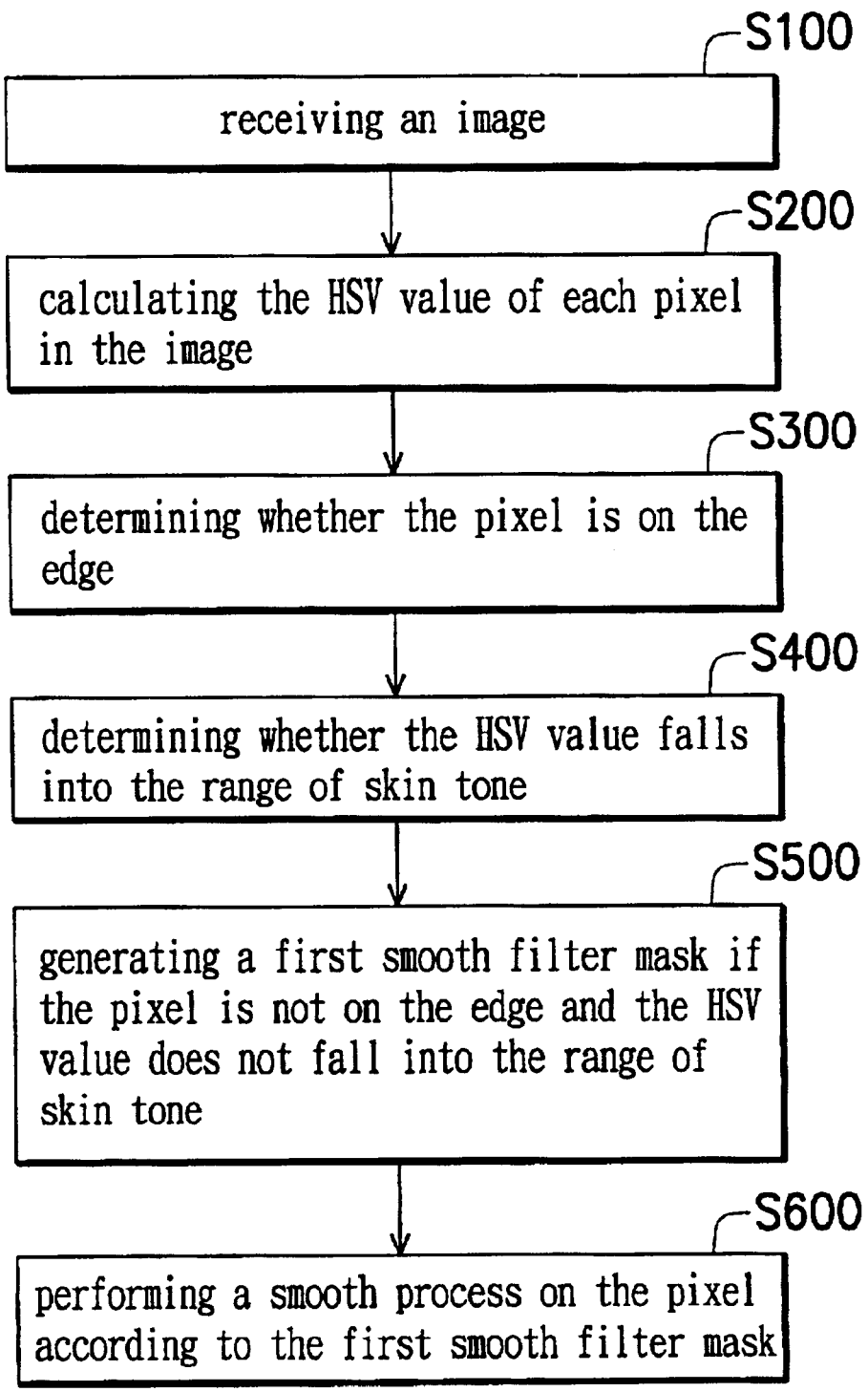
FIG. 1 is a flow chart illustrating the operation of eliminating irregularities in the image enhancement method according to the embodiment of the present invention.

FIG. 1 shows the operation of eliminating irregularities in the image enhancement method according to the embodiment of the present invention. in step S100, an image described in RGB format (first image format) is received. Then, in step S200, the HSV (second image format) value of each pixel in the image is calculated. The HSV value is transformed from the RGB value by employing a transform function or a transform matrix.

Figure 2:
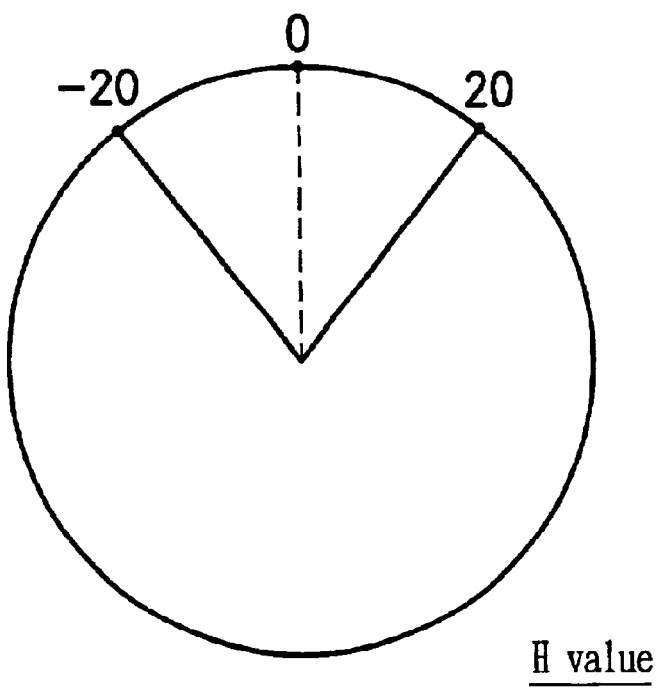
FIG. 2 is a schematic diagram showing the HSV distribution of skin tones.
Figure 2:
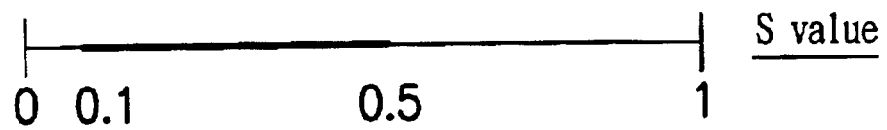
Figure 2:

Thereafter, in step 300, each pixel is assessed with respect to its location on the edge of the image by employing an edge detection method, and in step S400 the HSV value of the pixel is assessed with respect to its falling within the range of skin tones. FIG. 2 shows the HSV distribution of skin tones, the range of H value falling withing the range of skin tones is 0~20 and 340~0 (−20~+20); the range of S value falling withing the range of skin tones is 0.1~0.5; and the range of V value falling withing the range of skin tones is 0.02~0.75. In other word, the process in step S400 determines whether the H value of the pixel falls into the range −20~+20, the S value of the pixel falls into the range 0.1~0.5, and the V value of the pixel falls into the range 0.02~0.75 or not.

Then, in step S500, a first smooth filter mask is dynamically generated if the pixel is not on the edge and the HSV value does not fall into the range of skin tones. The first smooth filter mask is employed to eliminate the irregularities on skin, and will be discussed later. Then, in step S600, a smooth process is performed on the pixel according to the first smooth filter mask. When all of the pixels in the image are processed from S300 to S600, the operation of eliminating irregularities is finished.

The operations of step S500 and S600 can be implemented in two aspects.

In the first aspect, an empty first smooth filter mask is generated for a pixel. Then, the HSV value of each of the adjacent pixels adjacent to the pixel are assessed with respect to its falling within the range of skin tones. The position corresponding to the adjacent pixel in the first smooth filter mask is recorded as "Valid" and given a fixed weight value if the HSV value of the adjacent pixel falls into the range of skin tones. For example, the fixed weight value is 1/9 if the size of the first smooth filter mask is 3×3.

Figure 3:
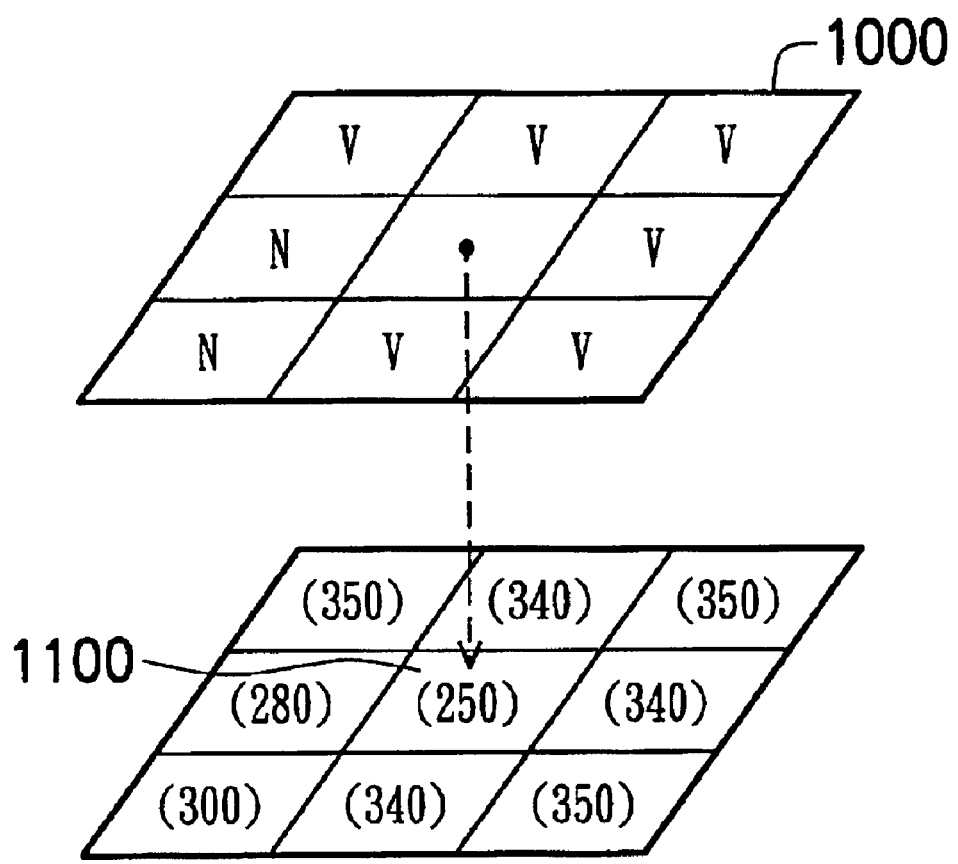
FIG. 3 is an example of the first smooth filter mask.

FIG. 3 shows an example of the first smooth filter mask 1000 generated according to the first aspect. The first smooth filter mask 1000 is generated for a pixel 1100, and the value in parentheses is the H value of the pixel. It should be noted that the S and V values are omitted to simplify description.

In this case, the position corresponding to the adjacent pixel in the first smooth filter mask 1000 is recorded as "Valid (V)" and given a fixed weight value, such as 1/9 (not shown) if the H value of the adjacent pixel falls into the range 0~20 or 340~0 (−20~+20); and the position corresponding to the adjacent pixel in the first smooth filter mask 1000 is recorded as "Not valid (N)" and given a weight 0 (not shown) if the H value of the adjacent pixel does not fall into the range 0~20 or 340~0 (−20~+20). In first aspect, only the adjacent pixels whose HSV values fall into the range of skin tones will be used to eliminate the irregularity pixel 1100.

Next, the smooth process in step S600 according to first aspect will be described as follows. a weighted process is performed on the RGB values of the adjacent pixels corresponding to the positions recorded "Valid" in the first smooth filter mask and the RGB value of the pixel, thus a weighted RGB value is acquired, and then the RGB value of the pixel is replaced by the weighted RGB value.

For example, in FIG. 3, if the RGB values of the adjacent pixels corresponding to the positions recorded "Valid" in the first smooth filter mask 1000 are RGB1, RGB2, RGB3, RGB4, RGB5, and RGB6 respectively, and the RGB value of the pixel 1100 is RGB0, then:

weighted $RGB$ value=$RGB1 \times (1/9) + RGB2 \times (1/9) + RGB3 \times (1/9) + RGB4 \times (1/9) + RGB5 \times (1/9) + RGB6 \times (1/9) + RGB0 \times (1 - 6 \times (1/9))$.

As mentioned above, only the adjacent pixels whose HSV values fall into the range of skin tones will be used to eliminate the irregularity pixel. When the number of the adjacent pixels whose HSV values fall into the range of skin tones is higher, the pixel after the irregularity elimination process will become closer to the skin tones. On the contrary, if the number of the adjacent pixels whose HSV values fall into the range of skin tones is lower, the pixel will have no effective change after the irregularity elimination process.

In the second aspect, an empty first smooth filter mask is generated for a pixel. Then, the weight value of the position corresponding to each of the adjacent pixels in the first smooth filter mask is determined according to the difference of the HSV value between the adjacent pixel and a target skin tones (or the correlation of the HSV values) and the distance between the adjacent pixel and the pixel.

Figure 4:
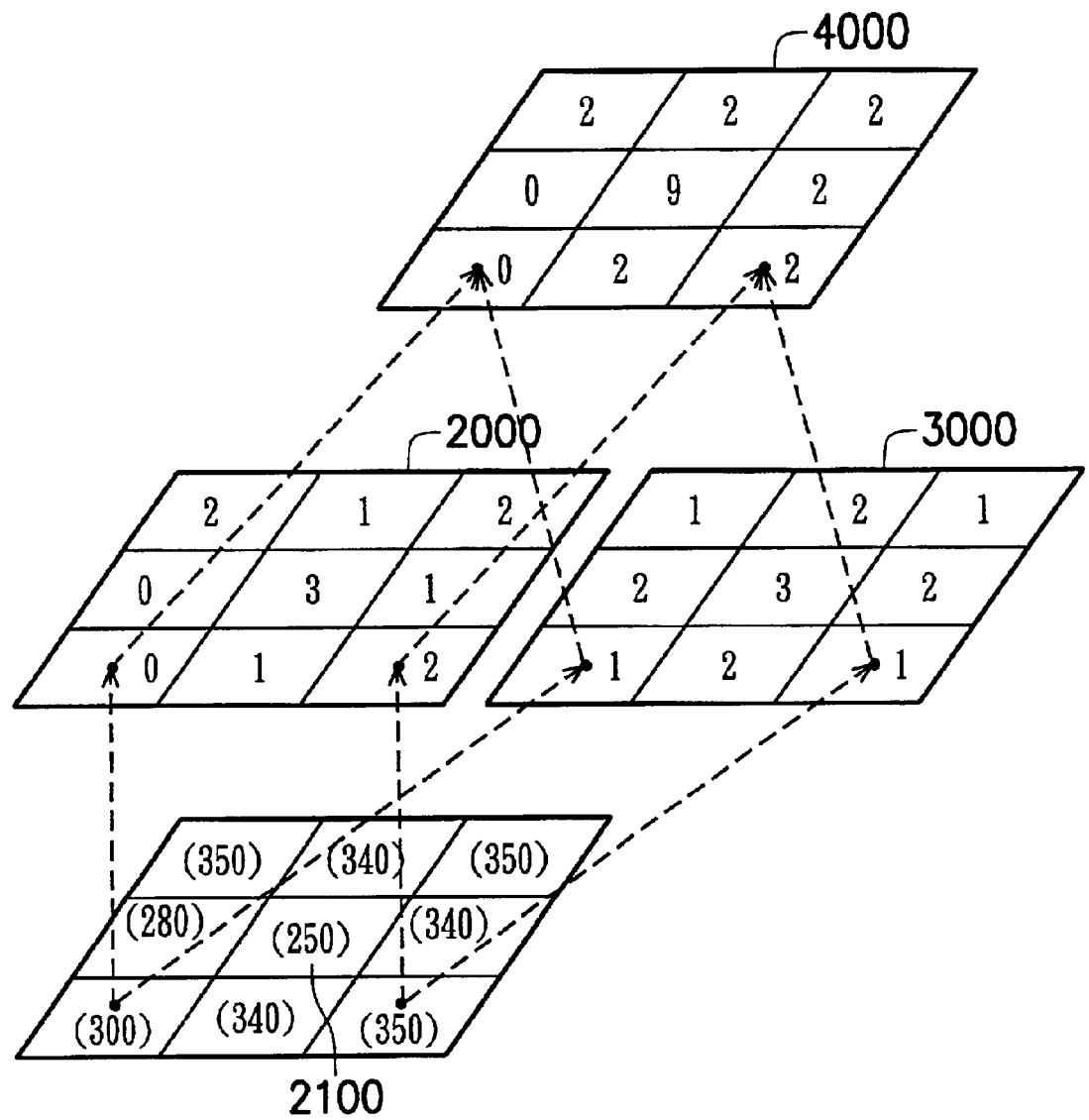
FIG. 4 is another example of the first smooth filter mask.

FIG. 4 shows an example of the first smooth filter mask 4000 generated according to the second aspect. The first smooth filter mask 4000 is generated for a pixel 2100, and the value in parentheses is the H value of the pixel. It should be noted that the S and V values are omitted to simplify description. In this case, a HSV mask 2000 can be generated according to the difference of the HSV value between each of the adjacent pixels and a target skin tones, such as H value 0, and a distance mask 3000 can be generated according to the distance between each of the adjacent pixels and the pixel.

In this case, if the HSV value of the adjacent pixel is closer to the target skin tones, the weight value corresponding to the adjacent pixel in the HSV mask 2000 is given higher, for example, the weight value can be set as 2 if the difference between H value of the adjacent pixel and the target skin tones is within 10, the weight value can be set as 1 if the difference between H value of the adjacent pixel and the target skin tones is within 10~20, the weight value can be set as 0 if the difference between H value of the adjacent pixel and the target skin tones is beyond 20, and the weight value of the pixel 2100 can be set as a fixed value, such as 3.

In addition, if the adjacent pixel is closer to the pixel 2100, the weight value corresponding to the adjacent pixel in the distance mask 3000 is given higher, for example, the weight value can be set as 2 if the adjacent pixel is immediately adjacent to the pixel 2100, the weight value can be set as 1 if the adjacent pixel is oblique adjacent to the pixel 2100, and the weight value of the pixel 2100 can be set as a fixed value, such as 3.

The first smooth filter mask 4000 can be acquired by combining the HSV mask 2000 and the distance mask 3000, for example, each element in the first smooth filter mask can be acquired by multiplying the weight value corresponding to the position of the element in the HSV mask 2000 and the weight value corresponding to the position of the element in the distance mask 3000. In other words, the adjacent pixels that are closer to the pixel and its HSV value is closer to the skin tones will be given more specific weight to eliminate the irregularity pixel 2100.

Next, the smooth process in step S600 according to second aspect will be described as follows. a weighted process is performed on all RGB values of the adjacent pixels and the RGB value of the pixel according to the weight values recorded in the first smooth filter mask, thus a weighted RGB value is acquired, and then the RGB value of the pixel is replaced by the weighted RGB value.

[General Smooth Process]

Figure 5:
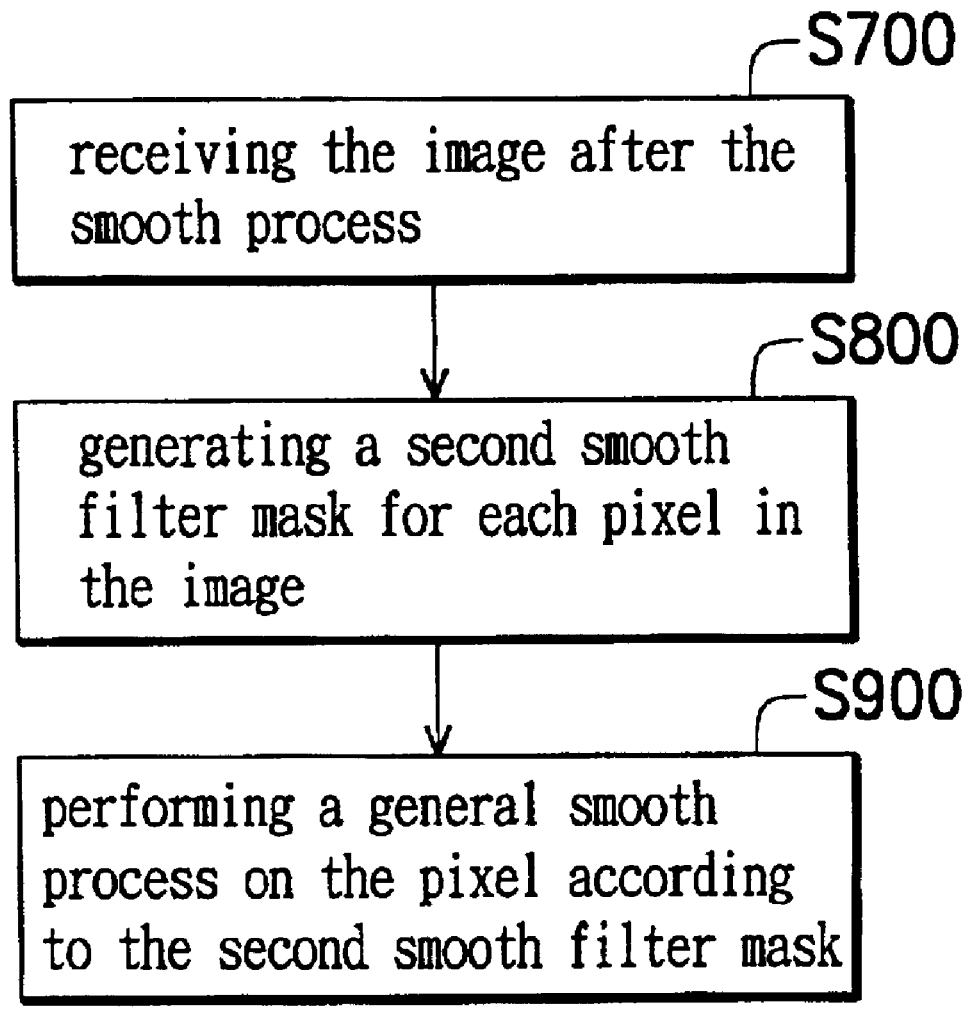
FIG. 5 is a flow chart illustrating the operation of general smooth process in the image enhancement method according to the embodiment of the present invention.

Next, FIG. 5 shows the operation of general smooth process in the image enhancement method according to the embodiment of the present invention.

in step S700, an image after the process of eliminating irregularities is received. Then, in step S800, a second smooth filter mask is dynamically generated for each pixel in the image. Finally, in step S900, a general smooth process is performed on the pixel according to the second smooth filter mask. When all of the pixels in the image are processed from S800 to S900, the operation of general smooth process is finished.

Similarly, the operations of step S800 and S900 can be implemented in two aspect.

In first aspect, an empty second smooth filter mask is generated for a pixel. Then, the weight value of the position corresponding to each of the adjacent pixels in the second smooth filter mask is determined according to the difference of the HSV value between the adjacent pixel and the pixel and the distance between the adjacent pixel and the pixel. The general smooth process in step S900 according to first aspect will be described as follows. a weighted process is performed on all RGB values of the adjacent pixels and the RGB value of the pixel according to the weight values recorded in the second smooth filter mask, thus a new RGB value is acquired, and then the RGB value of the pixel is replaced by the new RGB value.

In second aspect, the second smooth filter mask can be a fixed mask, that is all of the weight values are the same. The fixed mask is employed to smooth process each of the pixels in the image.

As a result, the image enhancement method according to the present invention can eliminate the influence of irregularities in two smooth process stages, so as to beautify the entire image.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An image enhancement method, comprising the steps of:
   receiving an image described in first image format; and, for each pixel in the image:
   determining whether the pixel is on the edge;
   determining whether the value of the pixel in a second image format falls into the range of skin tones;
   generating a first smooth filter mask if the pixel is not on the edge and the value does not fall into the range of skin tones; and
   performing a smooth process on the pixel according to the first smooth filter mask.

2. The method as claimed in claim 1 further calculating the value of the pixel in second image format.

3. The method as claimed in claim 1 further comprising the steps of, for each pixel in the image:
   generating a second smooth filter mask; and
   performing a general smooth process on the pixel according to the second smooth filter mask.

4. The method as claimed in claim 3 wherein all positions in the second smooth filter mask are set as valid.

5. The method as claimed in claim 3 wherein the method of generating the second smooth filter mask comprises the steps of:
   generating an empty second smooth filter mask; and
   setting the weight value of the position corresponding to each of the adjacent pixels in the second smooth filter mask according to the difference of the value with second image format between the adjacent pixel and the pixel and the distance between the adjacent pixel and the pixel.

6. The method as claimed in claim 5 wherein the method of performing the general smooth process on the pixel according to the second smooth filter mask comprises the steps of:
   performing a weighted process on all values with first image format of the adjacent pixels and the value with first image format of the pixel according to the weight values set in the second smooth filter mask, thus a new weighted value is acquired; and
   replacing the value with first image format of the pixel by the new weighted value.

7. The method as claimed in claim 1 wherein the first image format is RGB format.

8. The method as claimed in claim 1 wherein the second image format is HSV format.

9. The method as claimed in claim 1 wherein an edge detection method is employed to determine whether the pixel is on the edge.

10. The method as claimed in claim 1 wherein the method of generating the first smooth filter mask comprises the steps of:
    generating an empty first smooth filter mask;
    determining whether the value of each of the adjacent pixels adjacent to the pixel in second image format falls into the range of skin tones; and
    setting the position corresponding to the adjacent pixel in the first smooth filter mask as valid.

11. The method as claimed in claim 10 wherein the method of performing the smooth process on the pixel according to the first smooth filter mask comprises the steps of:
    giving a fixed weight value to the positions recorded as valid in the first smooth filter mask;
    calculating the weight value corresponding to the pixel according to the fixed weight values corresponding to the positions set as valid in the first smooth filter mask;
    performing a weighted process on the values with first image format of the adjacent pixels corresponding to the positions set as valid in the first smooth filter mask and the value with first image format of the pixel according to the fixed weight values corresponding to the adjacent pixels and the weight value corresponding to the pixel, thus acquiring a weighted value; and
    replacing the value with first image format of the pixel by the weighted value.

12. The method as claimed in claim 1 wherein the method of generating the first smooth filter mask comprises the steps of:
    generating an empty first smooth filter mask; and
    setting the weight value of the position corresponding to each of the adjacent pixels in the first smooth filter mask according to the difference of the value with second image format between the adjacent pixel and a target skin tones and the distance between the adjacent pixel and the pixel.

13. The method as claimed in claim 12 wherein the method of performing the smooth process on the pixel according to the first smooth filter mask comprises the steps of:
    performing a weighted process on all values with first image format of the adjacent pixels and the value with first image format of the pixel according to the weight values set in the first smooth filter mask, thus a weighted value is acquired; and
    replacing the value with first image format of the pixel by the weighted value.

* * * * *